(12) United States Patent
Kelly

(10) Patent No.: US 9,507,356 B2
(45) Date of Patent: Nov. 29, 2016

(54) ADAPTIVE CONTROLLER FOR CONTROL OF A DC-DC POWER SUPPLY

(75) Inventor: Anthony Kelly, Old Kildimo (IE)

(73) Assignee: ROHM POWERVATION LIMITED, Blackrock, Cork (IE)

( * ) Notice: Subject to any disclaimer, the term of this patent is extended or adjusted under 35 U.S.C. 154(b) by 114 days.

(21) Appl. No.: 13/579,869

(22) PCT Filed: Feb. 15, 2011
(Under 37 CFR 1.47)

(86) PCT No.: PCT/EP2011/052202
§ 371 (c)(1),
(2), (4) Date: Oct. 29, 2012

(87) PCT Pub. No.: WO2011/101341
PCT Pub. Date: Aug. 25, 2011

(65) Prior Publication Data
US 2013/0265021 A1    Oct. 10, 2013

Related U.S. Application Data

(60) Provisional application No. 61/305,631, filed on Feb. 18, 2010.

(30) Foreign Application Priority Data

Feb. 18, 2010    (GB) .................................. 1002741.5

(51) Int. Cl.
G05F 1/46     (2006.01)
G05F 1/10     (2006.01)
H02M 3/157    (2006.01)
H02M 3/335    (2006.01)

(52) U.S. Cl.
CPC . G05F 1/46 (2013.01); G05F 1/10 (2013.01); G05F 1/468 (2013.01); H02M 3/157 (2013.01); H02M 3/33515 (2013.01)

(58) Field of Classification Search
CPC ........................................................ G05F 1/46
USPC ......... 323/273, 283, 271, 222; 700/297, 298
See application file for complete search history.

(56) References Cited

U.S. PATENT DOCUMENTS 7,586,767 B1 *  9/2009  Prodic et al. ................... 363/65
7,622,820 B1    11/2009  Prodic et al.
(Continued)

FOREIGN PATENT DOCUMENTS

WO    WO 2011/101341 A2    8/2011

OTHER PUBLICATIONS

Patent Cooperation Treaty, International Search Report/Written Opinion for International Application No. PCT/EP2011/052202, Powervation Limited, dated Dec. 23, 2011, 12 pages.
(Continued)

Primary Examiner — Matthew Nguyen
Assistant Examiner — Trinh Dang
(74) Attorney, Agent, or Firm — Hickman Palermo Becker Bingham LLP; Edward A. Becker

(57) ABSTRACT

The present application provides a tunable compensator providing a control signal to control a switch in a power supply. A measurement is taken of the level of activity of the control signal. This measurement is used to introduce a bias into a tuner tuning the compensator when the amount of activity in the control signal drops.

18 Claims, 2 Drawing Sheets

(56) References Cited

U.S. PATENT DOCUMENTS

2007/0257653 A1* 11/2007 Naka .................. H02M 3/157
                                                                323/284
2008/0007241 A1*  1/2008 Isham ........................ 323/285
2009/0044031 A1*  2/2009 Vinayak et al. ............. 713/300
2009/0309567 A1  12/2009 Morroni et al.

OTHER PUBLICATIONS

Intellectual Property Office, Search Report and Examination Report under Sections 17 and 18(3) for GB Patent Application No. GB 1002741.5, Powervation Limited, dated Jun. 22, 2010, 8 pages.

Zhao, Zhenyu, et al., "Limit-Cycle Oscillations Based Auto-Tuning System for Digitally Controlled DC-DC Power Supplies", IEEE Transactions on Power Electronics, vol. 22, No. 6, Nov. 2007, pp. 2211-2222.

Shirazi, Mariko, et al., "An Autotuning Digital Controller for DC-DC Power Converters Based on Online Frequency-Response Measurement", IEEE Transactions on Power Electronics, vol. 24, No. 1, Nov. 2009, pp. 2578-2588.

Stefanutti W., et al., "Closed-Loop Model Reference Tuning of PID Regulators for Digitally Controlled DC-DC Converters Based on Duty-Cycle Perturbation", The $33^{rd}$ Annual Conference of the IEEE Industrial Electronics Society (IECON), Nov. 5-8, 2007, Taipei, Taiwan, pp. 1553-1558.

European Patent Office, "International Preliminary Report", in application No. PCT/EP2011/052202, dated Feb. 18, 2010, 7 pages.

Current Claims in application No. PCT/EP2011/052202, dated Feb. 2010, 2 pages.

* cited by examiner

ADAPTIVE CONTROLLER FOR CONTROL OF A DC-DC POWER SUPPLY

CROSS-REFERENCE TO RELATED APPLICATIONS; BENEFIT CLAIM

This U.S. National Stage Patent Application under 35 U.S.C. §371 claims the benefit of International Patent Application No. PCT/EP2011/052202 filed Feb. 15, 2011, entitled "AN ADAPTIVE CONTROLLER FOR CONTROL OF A DC-DC POWER SUPPLY" which claims priority to British Patent Application No. GB1002741.5 filed Feb. 18, 2010, entitled "AN ADAPTIVE CONTROLLER FOR CONTROL OF A DC-DC POWER SUPPLY" and which claims priority to U.S. Provisional Patent Application No. 61/305,631 filed Feb. 18, 2010, entitled "AN ADAPTIVE CONTROLLER FOR CONTROL OF A DC-DC POWER SUPPLY" the entire contents of all of which are hereby incorporated by reference as if fully set forth herein, under 35 U.S.C. §119(e).

FIELD

The present application relates to DC-DC power supplies and methods for controlling same.

BACKGROUND

DC-DC converters are devices which are employed to convert an input DC voltage to another DC voltage. DC-DC converters may be classified generally as linear or switching. A conventional arrangement for a switching DC-DC converter uses a power stage comprising one or more switching devices and one or more inductors or capacitors or both to convert an input voltage ($V_{in}$) to an output voltage ($V_{out}$). A controller is employed to try and maintain the output voltage at a desired set point. Conventionally, pulse width modulation is employed to control the operation of the switching devices within the power stage and accordingly the controller provides a control signal to a PWM module which operates the switching devices. A variety of different switching circuit topologies may be employed within the power stage which will be familiar to those skilled in the art, including for example the conventional buck and boost topologies. In a linear switching supply, the gain of a transistor or similar device is adjusted to achieve a desired output from an input voltage.

The output from the DC-DC converter is typically provided to a load which may be an electronic circuit comprising a plurality of components or just a single component, for example an LED light.

To improve the performance of the controller it is known to use adaptive control, an example of which is for example described in U.S. Ser. No. 12/439,802, which is assigned to the present assignee, the entire contents of which are hereby incorporated by reference. The use of adaptive control significantly improves the performance of controllers. In the referenced patent application, two controllers are provided which operate jointly in parallel and whose outputs are combined together in a balanced manner. The adaptive control function alters the balance point between the two controllers to bias the control towards one or other of the controllers. An advantage of this approach is that stability is ensured notwithstanding the control function being changed by the adaptive elements. In these arrangements, the adaptive controller is effectively tuned with a single degree of freedom, which provides stability in the tuning process by allowing the overall control function to vary between a cautious and an aggressive function.

Adaptive controllers require excitation in order provide the necessary information for adaptation to occur. Where persistent excitation does not exist, the adaptive controller may not tune optimally, or may fail to tune at all. It is possible to excite the adaptive controller by introducing an external stimulus such as pseudo-random noise, or a periodic signal, but the disturbance this causes to voltage regulation is often unacceptable. The term external used in this context refers to the excitation being external to the adaptive control circuit, rather than its physical characteristics. Similarly a non-linearity may be introduced into the control loop to introduce a disturbance. Thus for example, in U.S. Pat. No. 7,586,767 which measures the characteristics of limit cycle oscillations to perform the tuning function, the limit cycle oscillations are caused by introducing a non-linearity in the control loop by altering the resolution of the PWM circuit. However again a disturbance is being introduced that may affect voltage regulation.

The present application seeks to improve the operation of adaptive controllers as employed generally in power supplies.

SUMMARY

The present application measuring the level of activity of the control signal from an adaptive controller introduces a bias into the adaptive controller as the amount of activity drops. It will also be appreciated that an external excitation source is not required in this technique.

More particularly, the present application provides a controller and\or method in accordance with the claims which follow.

The techniques of the present patent application may be applied within single or multiple phase control ICs.

DETAILED DESCRIPTION OF DRAWINGS

Figure 1:
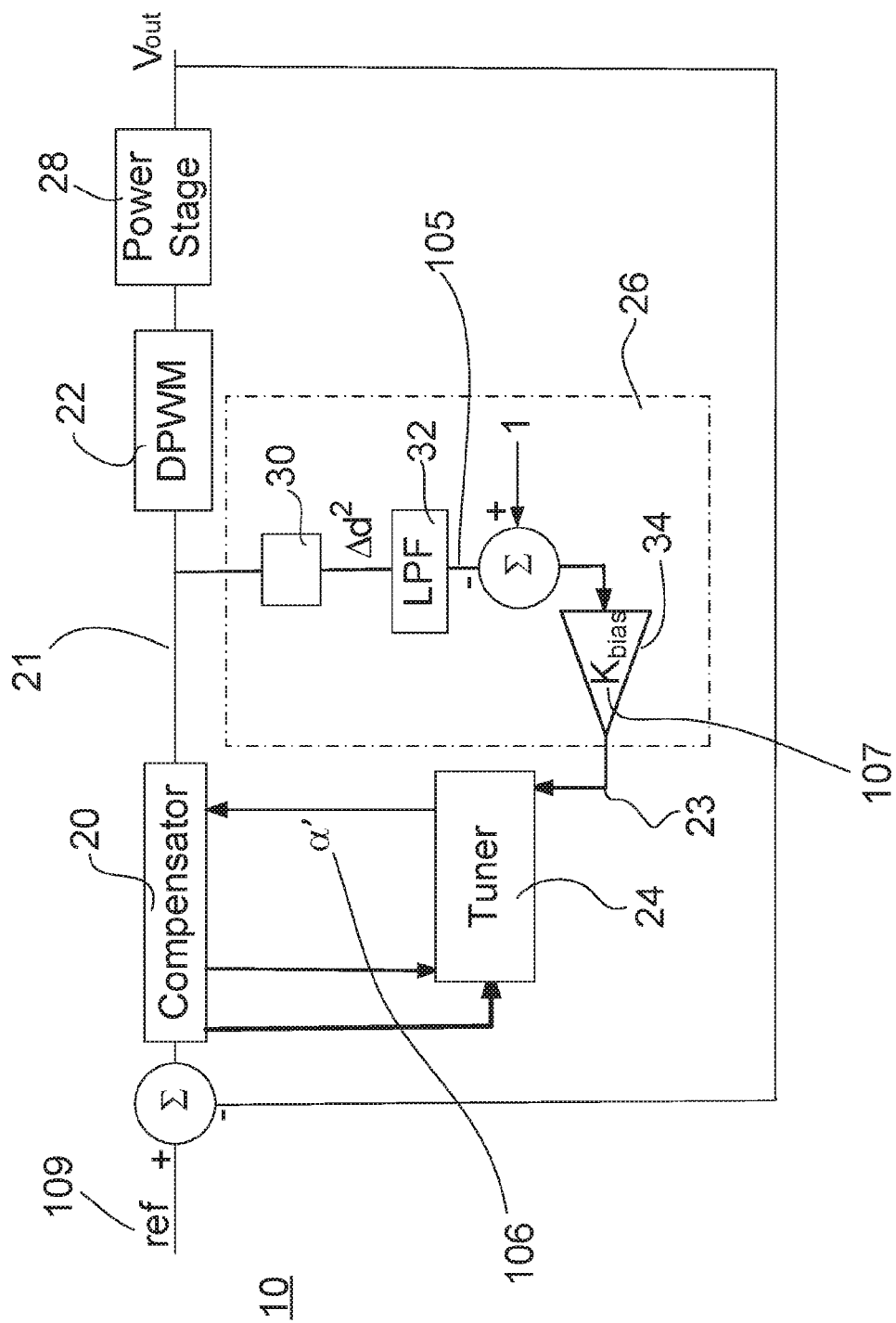
FIG. 1 is a block diagram of a DC-DC converter according to a first embodiment of the application.

The present application is directed to switch mode power supplies, for example of the type where Pulse Width Modulation (PWM) is used to control one or more switching elements. PWM may be implemented using a PWM circuit which provides switching signals to one or more switches in the power supply. A controller controls the PWM circuit in an effort to maintain an output from the power supply (typically voltage) at a desired setpoint as shown in the arrangement of FIG. 1. More specifically, the arrangement comprises a compensator 20 which operates to provide a control signal 21 to a digital pulse width modulation circuit 22 which in turn drives a power stage 28 to provide an output voltage (Vout). The compensator seeks to maintain the output voltage at a value dictated by a set point 109 (ref). The control function (parameters) of the compensator is tunable by a tuner 24. The combination of the compensator and the tuner together provide an adaptive controller. The compensator may be any suitable controller, including for example P, PI or PID type controllers. The control function of the controller may have a plurality of parameters which may be varied or set. In turn the tuner using a suitable tuning algorithm may adjust or set one or more of these parameters.

In an exemplary arrangement using an adaptive controller design of the Assignee of the present application, the control function of the compensator is configured to have a single degree of freedom so that changes in controller parameters may be based on a single tuning value ($\alpha$) which, in turn, is obtained from the tuner. An example of such an adaptive controller (as referenced above) is described in U.S. Ser. No. 12/439,802, which is assigned to the present assignee, the entire contents of which are hereby incorporated by reference. In the referenced patent application, two controllers are provided which operate jointly in parallel and whose outputs are combined together in a balanced manner to provide an overall control output. The adaptive control function alters the balance point between the two controllers to bias the control towards one or other of the controllers. The control function may be stated generally as: $C_{out}=C_1\alpha+C_2(1-\alpha)$, where $C_1$ and $C_2$ are the outputs from each of the individual controllers, $C_{out}$ is the overall output and $\alpha$ is the previously described tuning value having a range between 0 and 1. In the context of DPWM the control function will produce a duty cycle signal d which fed to a DPWM module. It will be appreciated that the function for the overall control function clearly has just one degree of freedom. It will be understood that other control functions are also available to provide a single degree of freedom and that accordingly the application is not to be construed as being limited to just this example. Having a single degree of freedom is beneficial in power supplies in that the controller transfer function is deterministic with respect to the tuning value $\alpha$, and may therefore be determined for all values of $\alpha$. Suitably, one of the controllers is designed to have a conservative control function with the second controller designed with a more aggressive control function. In operation, the tuner uses measurements from the compensator to determine the optimum balance point between the conservative and the aggressive controller. During periods of load inactivity, in which persistent excitation is lacking, the nature of the tuning function which for example may seek to minimize error, causes the balance to tend towards the conservative controller. After such a period without persistent excitation, the adaptive tuning should react quickly once load activity occurs in order to re-tune the controller to the new optimum point, i.e. the tuner will cause the controller to shift away from the conservative controller and towards the aggressive controller. However, the rate at which the tuning may occur may mean the controller's performance when a sudden change occurs is less than ideal. Thus, during these inactive periods, the present application seeks to stimulate the adaptive control function by tuning more towards the aggressive controller, which will provide more control activity in the loop, thereby providing persistent excitation, which allows the adaptive controller to adapt quickly to changing load conditions. Overall regulation performance over a wide range of load conditions may be improved by this method. It will be appreciated that this is achieved without disturbing the normal operation of the compensator control loop, i.e. no disturbances are required to be introduced into the compensator control loop.

It may be convenient to view of the adaptive mechanism of this application as having dual goals (or modes), a) optimize regulation and b) stimulate loop excitation; yielding an adaptive controller that reacts appropriately to a wide range of load conditions, and obviates the need for external excitation. In general, existing dual-control methods introduce external disturbances (probing signals) or a hard limit on the variance of the control signal at a pre-determined limit which produces an unacceptable level of noise on the regulated voltage output, and results in undesirable behavior in the tuning process.

Figure 2:
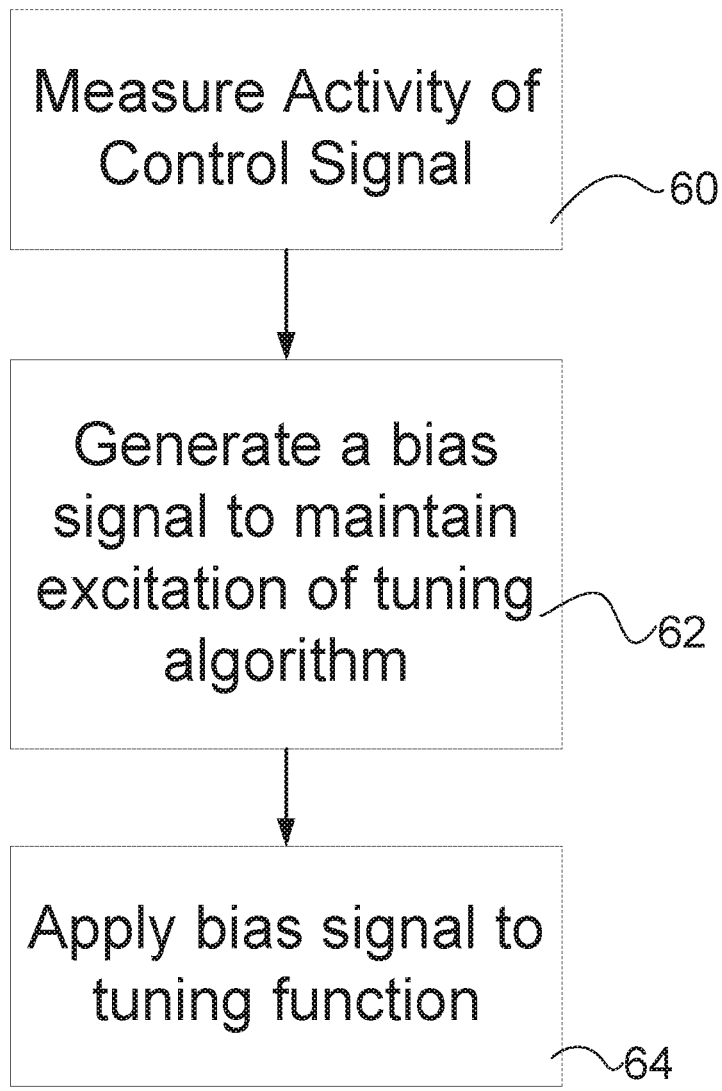
FIG. 2 is a flow chart of a method for use, for example, with the DC-DC converter of FIG. 1.

The embodiment of FIG. 1 includes a biasing mechanism 26 to effect the dual mode adaptive control scheme described above, with a method shown in FIG. 2. This biasing mechanism measures 60 the amount of change on the output control signal 21 of the compensator and generates 62 a bias signal 23 for the tuner when the excitation is low, i.e. in situations where the controller may become conservative. In the tuner, the bias signal is effectively added\ subtracted (as appropriate) 64 to the $\alpha$ value generated within the tuner to provide a modified $\alpha$ value. In periods of persistent excitation, the biasing mechanism provides little or no bias signal and the tuner functions as before.

In the biasing mechanism, an activity measurement module, for example variance element 30, measures the variance of the control signal and a measure of activity $\Delta d$ is obtained. It will be appreciated that an absolute measure such as variance is required rather than an average since an average value will be approximately the same regardless of the amount of change, and the object is to measure the amount of activity. For example the average of a sine wave would be zero regardless of the values of the peaks, using an absolute value a measure is obtained. It will also be appreciated that various methods exist for determining a signal's level of activity such as its variance or a suitable mathematical norm such as the 2-norm or 1-norm. A low pass filter (32) is employed for providing a time average estimate 105 of the measured control activity to limit the effect of instantaneous values and provide an estimate of the long term signal variance. Suitably a gain is incorporated within the variance element or the low pass filter to normalize the maximum value of the variance value leaving the LPF to 1, i.e. the measure of activity is limited to a range between 0 and 1. This activity value is then subtracted from a value of 1. The resulting value will be close to 0 during periods of significant change in the control signal from the compensator and close to 1 in periods of no change.

This signal is then fed through a gain element 34 having a gain value 107 for limiting the effect of the bias signal. The resulting signal 23 is fed to the tuner where it is added to the internal tuning value $\alpha$ being provided to the compensator to provide a modified $\alpha'$ which is used as a single tuning value 107 by the compensator. This signal $\alpha'$ effectively weights the adaptive bias such that during periods of inactivity, where persistent excitation of the adaptive loop is lacking, the adaptive tuning is biased. It will be appreciated that in the context of the present exemplary embodiment, during periods of low activity on the control signal 21, the bias mechanism 26 will generate a bias signal to tend the compensator towards the more aggressive of the two control functions. Conversely, the adaptive tuning remains unbiased during periods where excitation is sufficient to affect loop adaptation. The value of $K_{bias}$, and frequency response of the LPF, may be suitably chosen to determine the amount of loop excitation which is considered to be sufficient. It will be appreciated that the dual mode adaptive control mechanism forms a control loop whose goal is to ensure excitation of the adaptive tuner in which the level of excitation is controlled, minimizing the output voltage noise introduced by the excitation. It will be further appreciated that the value of $K_{bias}$ and the characteristics of the LPF may vary from system to system depending on the characteristics of the control functions being employed. Appropriate values for the characteristics of the LPF and $K_{bias}$ may be determined for example, by analysis of the loop involving $K_{bias}$ and the LPF. Whilst, the described arrangement of the biasing mechanism is effective. It will be appreciated that modifications and alternatives may be provided. For example, a threshold may be applied to the measured variance, i.e. whereby only when the variance drops below the threshold does the biasing mechanism become operable. It will be appreciated that such a threshold may be implemented at different points within the biasing mechanism. In any event, it will be appreciated that purpose of the biasing mechanism is not to determine\set the tuning value as this function is performed by the tuning algorithm of the tuner. Instead it is to compensate for the tuning algorithm becoming conservative during periods of low activity in the control loop. It will be appreciated that whilst several different embodiments have been described herein, that the features of each may be advantageously combined together in a variety of forms to achieve advantage. Thus for example, whilst the above description has been made with reference to an exemplary controller as employed by the present assignee, it will be appreciated that the method may also be applied and\or incorporated within other adaptive control schemes. Similarly, whilst the above system and method has been described generally with respect to a switch mode power supply, it will be appreciated that the technique may also be applied to non-switching (linear) power supplies. It will be appreciated that in such an arrangement, the DPWM would be replaced with a linear driving stage and the power stage would be a linear mode power stage.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A controller for a power supply, the controller being configured to provide a control signal to maintain the output of the power supply at a set-point, the controller comprising:
   a compensator having a tunable control function,
   a tuner implementing a tuning algorithm using measurements from the compensator to provide at least one tuning value to tune the tunable control function of the compensator,
   a bias mechanism configured to measure the activity of the control signal and to provide a bias signal to the tuning algorithm of the tuner in response to the measured activity of the control signal,
   wherein the measured activity of the control signal is a measurement of the variance of the control signal and wherein the bias mechanism includes a low pass filter for providing a time average estimate of the measured activity of the control signal and wherein the tuning algorithm does not employ limit cycle oscillations.

2. The controller according to claim 1, further comprising a module for generating at least one switching signal from the control signal, the at least one switching signal operating at least one switch in the power supply.

3. The controller according to claim 1, wherein the power supply is a linear power supply.

4. The controller according to claim 1, wherein the compensator has a tunable control function tunable by a single tuning value.

5. The controller according to claim 1, wherein the bias mechanism uses a gain value for limiting the effect of the bias signal.

6. The power supply comprising a controller according to claim 1.

7. The controller according to claim 2, wherein the power supply is a switch mode power supply and the module for generating at least one switching signal is a PWM module.

8. The controller according to claim 7, wherein the PWM module is a digital PWM module.

9. A method for tuning a compensator, without employing limit cycle oscillations, within a controller for a power supply, the compensator having a tunable control function being configured to generate a control signal to maintain the output of the power supply at a set-point, the method comprising:
   a) using a tuning algorithm using measurements from the compensator to provide at least one tuning value to tune the tunable control function,
   b) measuring the activity of the control signal,
   c) biasing the at least one tuning value in accordance with the measured activity of the control signal,
   wherein the measured activity of the control signal is determined from the variance of the control signal and wherein the measured activity of the control signal is a low pass filtered measurement of the activity of the control signal.

10. The method for tuning according to claim 9, wherein the amount of biasing is selected to maintain excitation of the tuning algorithm.

11. The method according to claim 9, wherein the amount of biasing is selected to maintain the tuner in persistent excitation.

12. The method according to claim 9, further comprising generating at least one switching signal from the control signal, the at least one switching signal for operating at least one switch in the power supply.

13. The method according to claim 9, wherein the tunable control function of the compensator is tunable by a single tuning value.

14. The method according to claim 9, wherein a gain is applied to reduce the measured value so as to limit the effect of the bias signal.

15. The method according to claim 12, wherein the power supply is a switch mode power supply and the at least one switching signal is a PWM signal.

16. The method according to claim 12, wherein the power supply is a linear power supply and the at least one switching signal is a biasing signal for a transistor.

17. A controller for a power supply, the controller being configured to provide a control signal to maintain the output of the power supply at a set-point, the controller comprising:
   a compensator having a tunable control function,
   a tuner implementing a tuning algorithm using measurements from the compensator to provide at least one tuning value to tune the tunable control function of the compensator without employing limit cycle oscillations,
   a bias mechanism configured to measure the activity of the control signal and to provide a bias signal to the tuning algorithm of the tuner in response to the measured activity of the control signal,
   wherein the measured activity of the control signal is a measurement of the absolute value of the control signal wherein the bias mechanism includes a low pass filter for providing a time average estimate of the measured activity of the control signal.

18. The controller according to claim 17, wherein the bias mechanism uses a gain value for limiting the effect of the bias signal.

* * * * *